US012339625B2

(12) United States Patent
Fiammingo et al.

(10) Patent No.: US 12,339,625 B2
(45) Date of Patent: Jun. 24, 2025

(54) TIMEPIECE DIAL DEVICE

(71) Applicant: ROLEX SA, Geneva (CH)

(72) Inventors: Daniel Fiammingo, Sciez (FR); Christophe Paillot, Sciez (FR)

(73) Assignee: ROLEX SA, Geneva (CH)

( * ) Notice: Subject to any disclaimer, the term of this patent is extended or adjusted under 35 U.S.C. 154(b) by 1035 days.

(21) Appl. No.: 16/822,786

(22) Filed: Mar. 18, 2020

(65) Prior Publication Data

US 2020/0301363 A1 Sep. 24, 2020

(30) Foreign Application Priority Data

Mar. 19, 2019 (EP) .................................... 19163858

(51) Int. Cl.
*G04B 19/14* (2006.01)

(52) U.S. Cl.
CPC .................................... *G04B 19/14* (2013.01)

(58) Field of Classification Search
CPC ...................................................... G04B 19/14
See application file for complete search history.

(56) References Cited

U.S. PATENT DOCUMENTS 6,404,704 B1 * 6/2002 Bossel ................. G04B 19/103 368/232
8,540,419 B2 * 9/2013 Winkler ................. G04B 19/10 368/232
8,947,983 B2 * 2/2015 Stark ...................... G04B 19/06 368/232
10,268,161 B2 * 4/2019 Vuille .................. G04B 19/103
10,996,630 B2 * 5/2021 Vuille .................. G04B 19/103
2013/0279304 A1 10/2013 Stark
2017/0176943 A1 6/2017 Vuille
2017/0176944 A1 6/2017 Vuille
2019/0210402 A1 * 7/2019 Vuille .................. G04B 19/103
2019/0278229 A1 * 9/2019 Trotta ........................ B24B 1/00
2019/0294111 A1 * 9/2019 Hattori ................... G04B 19/14

FOREIGN PATENT DOCUMENTS

| | | | |
|---|---|---|---|
| CH | 712 002 | A2 | 7/2017 |
| EP | 2 653 939 | A1 | 10/2013 |
| EP | 3 185 085 | A1 | 6/2017 |
| EP | 3 185 086 | A1 | 6/2017 |

OTHER PUBLICATIONS

European Search Report and Written Opinion dated Sep. 12, 2019 issued in counterpart application No. EP19163858; w/ English machine translation (14 pages).

* cited by examiner

*Primary Examiner* — Edwin A. Leon
*Assistant Examiner* — Jason M Collins
(74) *Attorney, Agent, or Firm* — WHDA, LLP

(57) ABSTRACT

A dial device including at least one applique and a dial provided with an opening for receipt of the applique, the dial including at least one first element for positioning and/or securing, the at least one applique including at least one second element for positioning and/or securing cooperating with the at least one first element, the device including dial-applique interface surfaces which are arranged in the thickness of the dial.

27 Claims, 8 Drawing Sheets

III- III

III- III

TIMEPIECE DIAL DEVICE

This application claims priority of European patent application No. EP19163858.4 filed Mar. 19, 2019, the contents of which is hereby incorporated by reference herein in its entirety.

The invention relates to a timepiece dial device. The invention also relates to a timepiece comprising a dial device of this type.

Watches with complications, in particular chronograph watches or watches with a countdown, generally comprise a dial provided with counters which are dedicated to the display of said complications. These counters are usually in the form of appliques which can be added onto the dial, typically by gluing, such as to be able to be machined and decorated independently from the dial. An assembly solution of this type is not without disadvantages, in particular with reference to its repeatability, particularly relating to the dosing of the glue and its development over a period of time. Alternatively, these counters can be integral with the dial. However, a dial design of this type can be limiting with respect to the decorations and/or endings provided on the counters and/or on the dial.

Devices for mechanical assembly of a counter on a dial are known in the prior art. By way of example, patent application CH712002 discloses a solution for removable assembly of a counter on a dial. For this purpose, the dial is provided with a resilient arm which is formed on the periphery of an opening in the dial, the free end of which arm is designed to be accommodated in a hollow formed in a flank of the counter. An assembly solution of this type is perpetuated by means of a cam which can be manipulated by an operator, which cam is designed to retain said end of the resilient arm against the hollow. This design is particularly complex. In addition, the stepped form of the counter, which is necessary for the machining of the hollow, does not make it possible to assemble the counter flush with, or slightly recessed from, the upper or outer surface of the dial.

It is also known to assemble dial appliques by means of riveting or crimping. For this purpose, the dial appliques are generally provided with feet. By way of example, patent application EP3185086 discloses different foot geometries which are designed to facilitate the deformation of said feet during the riveting operation.

The objective of the invention is to provide a dial device which improves the devices known in the prior art. In particular, the invention proposes a dial device comprising an applique fitted on a dial in a manner which is repeatable, reliable and perpetual.

According to the invention, a dial device is defined by the following point 1.

1. A dial device comprising at least one applique and a dial provided with an opening for receipt of the applique, the dial comprising at least one first element for positioning and/or securing, the at least one applique comprising at least one second element for positioning and/or securing cooperating with the at least one first element, the device comprising dial-applique interface surfaces which are arranged in the thickness of the dial.

Different embodiments of the dial device are defined by the following points 2 to 13.

2. The dial device as defined in point 1, wherein the at least one first element for positioning and/or securing comprises a foot or a hole, and/or wherein the at least one second element for positioning and/or securing comprises a hole or a foot.

3. The dial device as defined in the preceding point, wherein the foot comprises a deformable end, in particular an end of the rivet type.

4. The dial device as defined in one of the preceding points, wherein the dial comprises at least one first projection from a first visible area of the dial, or wherein the applique comprises at least one second projection from a second visible area of the applique.

5. The dial device as defined in point 4, wherein the at least one first element for positioning and/or securing is disposed on the at least one first projection.

6. The dial device as defined in the preceding point, wherein the width of at least one first projection is less than 15 times, or less than 10 times, or less than 8 times the thickness of the at least one first projection.

7. The dial device as defined in point 5 or 6, wherein the applique comprises at least one first housing for receipt of the at least one first projection.

8. The dial device as defined in one of points 4 to 7, wherein the at least one second element for positioning and/or securing is disposed on the at least one second projection.

9. The dial device as defined in the preceding point, wherein the width of the at least one second projection is less than 15 times, or less than 10 times, or less than 8 times the thickness of the at least one second projection.

10. The dial device as defined in point 8 or 9, wherein the dial comprises at least one second housing for receipt of the at least one second projection.

11. The dial device as defined in one of points 8 to 10, wherein it comprises at least one first applique which is positioned relative to the dial according to a first orientation defined by a first angle, and a second applique which is positioned according to a second orientation defined by a second angle, the first and the second orientations being different, in particular the first and the second orientations forming an angle or having a difference of at least 10° relative to one another.

12. The dial device as defined in one of the preceding points, wherein the at least one first element for positioning and/or securing comprises feet which are disposed on an inner face of the dial, in particular on the dial-applique interface surface, or wherein the at least one second element for positioning and/or securing comprises feet which are disposed on an inner face of the applique, in particular on the dial-applique interface surface.

13. The dial device as defined in one of the preceding points, wherein the applique is arranged recessed from the non-visible surface of the dial, and/or wherein the applique is arranged recessed from the visible surface of the dial, and/or wherein the device comprises a coding means for fitting of the applique on the dial.

According to the invention, a timepiece is defined by the following point 14.

14. A timepiece, in particular a wristwatch, comprising a device as defined in one of points 1 to 13.

An embodiment of the timepiece is defined by the following point 15.

15. The timepiece as defined in the preceding point, wherein it comprises a movement comprising a movement blank, the at least one applique being disposed between the dial and the movement blank.

The appended figures represent by way of example two embodiments of a timepiece according to the invention.

Figure 1:
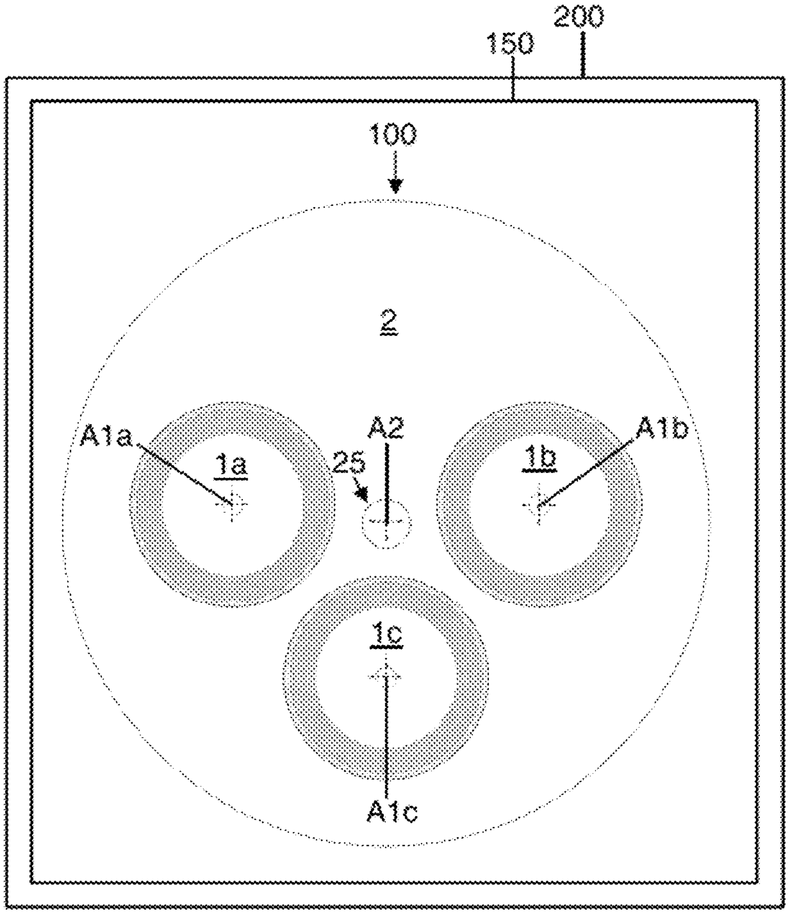
FIG. 1 is a schematic view from above of a first embodiment of a timepiece.

A first embodiment of a timepiece 200 according to the invention is described hereinafter with reference to FIGS. 1 to 7.

The timepiece 200 is for example a wristwatch. The timepiece preferably comprises a watch case, a timepiece movement 150 and a first embodiment of a dial device 100. The timepiece movement and the dial device are fitted secured in the watch case. In particular, the movement 150 comprises a movement blank 3.

The timepiece movement can be an electronic movement or mechanical movement, in particular an automatic movement.

The dial device 100 comprises at least one applique 1 and a dial 2 provided with an opening 24 for receipt of the applique. The dial comprises at least one first element 20*a* for positioning and/or securing. The at least one applique comprises at least one second element 10*a*, 10*b* for positioning and/or securing which cooperates with the at least one first element. By means of this cooperation, the first and second elements for positioning and/or securing make it possible to position and/or secure the applique on the dial. The device comprises dial-applique interface surfaces 12, 22 which are arranged in the thickness of the dial e2.

In the first embodiment, the two elements for positioning and/or securing (or guiding and/or mechanical securing) comprise openings or holes 10*a*. All or part of these second elements are preferably disposed on lobes or projections or lugs 10 formed on the periphery of the applique 1. Advantageously, these second elements are disposed on projections or lugs 10 formed on the periphery of the applique 1. These openings 10*a* are designed to cooperate with the first elements for positioning and/or securing (or guiding and/or mechanical securing). These first elements comprise feet 20*a*. These feet are disposed on an inner surface 22 of the dial 2.

Preferably, these projections 10 are in the form of lobes 10 which project towards the outside of the applique 1 on a plane which is parallel or substantially parallel to an outer surface 13 of said applique, which surface can appear within the opening 24 for receipt of the applique. More particularly, these projections 10 are preferably in the form of lobes 10 extending radially relative to an axis A1 which is perpendicular to the outer surface 13 of the applique, and in particular relative to an axis A1 centered on the applique. Preferably, when the wearer of the timepiece looks at the dial fitted in the timepiece, the lobes 10 which project on the outside of the opening 24 for receipt of the applique, and are disposed on an inner surface of the dial, are not visible to the wearer of the timepiece.

Preferably, the projections 10 are designed to be accommodated in openings or housings 20 in the dial which are contiguous to the through opening 24 in the dial which is designed to show the outer surface 13 of the applique 1 at the same level, or substantially at the same level, as an outer surface 23 of the dial 2.

The openings 20 are preferably blind openings, such that the projections 10 cannot be seen by the wearer looking at the dial device assembled in the timepiece.

These openings 20 are formed on an inner surface 21 of the dial, which surface is designed to come into contact with a movement blank 3 or in the vicinity of a movement blank 3 of the timepiece movement 150.

The base of each of the openings 20 preferably defines a single surface 22 on which the feet 20*a* are disposed. Preferably, these feet 20*a* are integral with the dial from the surface 22. Alternatively, these feet 20*a* can be added onto the dial, for example by driving, brazing or welding.

According to a preferred form of execution of the first embodiment, each foot 20*a* can be formed such as to pass through an opening 10*a* from one side to another, and is in the form of a rivet 20*a*, the free end 20*b* of which is designed to be deformed plastically against a projection 10, in particular against a chamfer 10*b* of the opening 10*a* in a projection 10. For this purpose, the rivet 20*a* can for example comprise an opening 20*c* such as to minimize the thickness of material forming the end 20*b* of the rivet, and/or such as to introduce a tool permitting the deformation of the end 20*b* of the rivet. It also makes it possible to prevent or to limit as far as possible the deformations of the dial during the assembly of the applique. "Rivet" in this case means any shaft, a free end of which is plastically deformable, in order to form a head making it possible to retain at least one element, in this case an applique, on the shaft.

Thus, in cooperation with an opening 10*a*, each rivet 20*a* defines an element for guiding of the applique 1 relative to the dial 2, which depends on the radial gap between the rivet 20*a* and the opening 10*a*. In cooperation with an opening 10*a*, each rivet 20*a* also defines an element for securing of the applique 1 on the dial 2 by means of plastic deformation of the end 20*b* against a chamfer 10*b* of the opening 10*a*. Alternatively, it would be possible to dissociate the guiding function that of securing, for example by providing feet 20*a*, in particular pins, which are dedicated specifically to the guiding function, as well as feet 20*a*, in particular rivets, which are dedicated specifically to the securing function.

In addition, the surface 22 of the dial 2 defines a surface for support against a surface 12 of the projection 10 of the applique 1. This surface 12 can be distinct from the surface 13 of the applique 1, which can appear within the through opening 24 in the dial. In particular, the surfaces 12 and 13 can be formed on distinct planes, in particular planes which are parallel and distant. Alternatively, the surfaces 12 and 13 can form a single surface, in particular a single plane, or substantially a single plane.

Preferably, dial-applique interface surfaces 12 and 22 are planes.

Preferably, the distance d2 which separates the surfaces 21 and 22 of the dial, i.e. the depth of the openings 20, is greater than the distance d1 which separates the surfaces 11 and 12 of the applique, the surfaces 11 and 12 being respectively inner and outer surfaces of the applique at a projection 10. Thus, the distance d1 constitutes the thickness of the projections. Since the distance d2 is preferably greater than the distance d1, the applique is embedded in the thickness of the dial. Also advantageously, it is possible to embed the applique in the thickness of the dial, such that no riveting extends from the surface 21 of the dial, which can constitute a support surface for the movement blank 3 of the timepiece movement. The thickness d1 of the applique is preferably disposed in the thickness e2 of the dial which separates the inner 21 and outer 23 surfaces of the dial.

In this first embodiment, each of the projections 10 is advantageously disposed between a support surface 22 of the dial and the movement blank 3 of the timepiece movement, these projections being "sandwiched". In other words, the at least one applique can be disposed between the dial and the movement blank. Thus, the applique 1 can remain in place, even in the case of extreme impacts, and independently of the state of the elements 20*a*, in particular riveting formed by the rivets 20*a*. Positioning of this type perpetuates the positioning of the applique relative to the dial, in particular the angular positioning of the applique relative to the dial. In fact, even if the connection between the applique and the dial breaks, the applique can be retained in place relative to the dial.

Preferably, the elements 10*a*, in particular the openings 10*a* of the applique 1, are all identical.

Also preferably, the projections 10 of the applique 1 are all identical.

The same preferably applies concerning the elements 20*a* of the dial 2, as well as the openings 20 in the dial 2.

In addition, the projections 10 and the elements 10*a* are preferably evenly distributed relative to an axis A1 which is centered on the applique 1. Thus, the applique does not need to be indexed relative to the dial during its assembly. A form of this type is particularly advantageous if the applique is marked, in particular pad-printed, only after assembly on the dial, for example for adding of a limb 14 on the outer surface 13 of the applique 1.

A limb of this type can advantageously be designed to cooperate with an indicator unit, which is not represented in the figures, and is designed to be accommodated in a through opening 15 in the applique, in particular a central opening 15.

Alternatively, a projection 10 or an opening 10*a* could constitute a coding means, such as to define a univocal positioning of the applique on the dial. For this purpose, the applique 1 can comprise projections 10 and/or openings 10*a* with different geometries. A form of this type is particularly advantageous if the surface 13 of the applique is already marked, in particular pad-printed, before it is fitted on the dial. The gap between at least one projection 10 or one opening 10*a* and at least one opening 20 or one foot 20*a* can thus be minimized, such as to assist a univocal positioning of the applique 1 on the dial 2.

In addition, the openings 20 have a format which is substantially equivalent to that of the projections 10, and have a geometry which is preferably complementary to that of the projections 10. Thus, the projections 10 can form alternative or complementary means for positioning of the applique on the dial.

Preferably, the projections 10 have a width 11 (measured parallel to the surface 11 or 12) which is less than 15 times the distance d1, or less than 10 times the distance d1, or less than 8 times the distance d1.

Also preferably, the openings 20 have a width 12 (measured parallel to the surface 21 or 22) which is less than 15 times the distance d2, or less than 10 times the distance d2, or less than 8 times the distance d2.

"Width" means the greatest distance (measured orthoradially relative to the axis A1 of the applique, or to an axis A24 of the opening 24 in the dial) separating two opposite walls of a projection 10, or of an opening 20 extending radially relative to the axis A1 of the applique, or to the axis A24 of the opening 24 in the dial.

In the case of an applique with a circular or substantially circular form, the point of a projection furthest from the axis A1 can be disposed on a circle with a radius r10, r10 being less than 1.5 times the radius r1 of the circle corresponding, or corresponding substantially, to the geometry of the main body of the applique, or less than 1.3 times the radius r1, or less than 1.2 times the radius r1. "Main body" means the structure from which the projections 10 project towards the outside of the applique 1, and/or the structure, the perimeter of which is defined by that of the surface 13 of the applique which is visible to the wearer of the watch when the applique is assembled on the dial in the timepiece. In addition, a point of an end of an opening 20 can be disposed on a circle with a radius r20 and centered on the axis A24, r20 being less than 1.5 times the radius r2 of the circle constituting a base from which the openings 20 are formed, or less than 1.3 times the radius r2, or less than 1.2 times the radius r2.

Once the applique 1 is assembled on the dial 2, the axes A1 and A24 are preferably merged.

In this first embodiment, the applique comprises three projections 10. It will be appreciated that the applique can comprise as many projections 10 as necessary, in particular in relation to the expected hold of the applique 1 on the dial 2.

Preferably, the outer surface 13 of the applique comprises decoration 16 formed by guilloché work or planing or snailing, which is different from that of the dial 2. By way of example, part of the surface 13 of the applique 1 illustrated in FIG. 6 comprises circular guilloché work 16.

It will be appreciated that the dial 2 can comprise a plurality of appliques.

Preferably, if the dial device comprises at least one first applique 1*a* positioned relative to the dial according to a first orientation a, and a second applique 1*b* positioned according to a second orientation 13, the first and the second orientations are different, in particular the first and the second orientations form an angle, in particular an angle with a value of at least 10°, relative to one another. The orientation of an applique can be defined as the smallest angle formed by a reference straight line which is located on the plane of the dial, and a straight line passing via the axis of the applique and via a projection of the applique, or by a second element 10*a* for positioning and/or securing of the applique.

Figure 2:
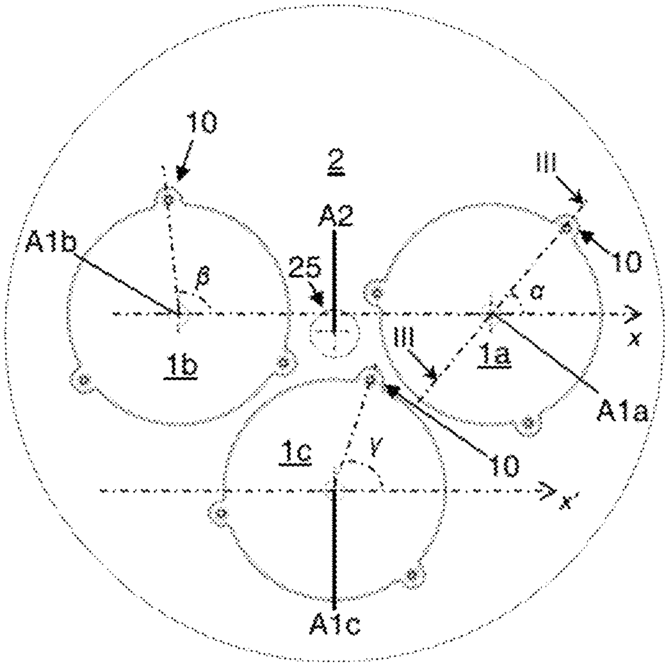
FIG. 2 is a view from below of a first embodiment of a dial device equipping the first embodiment of the timepiece.
Figure 3:
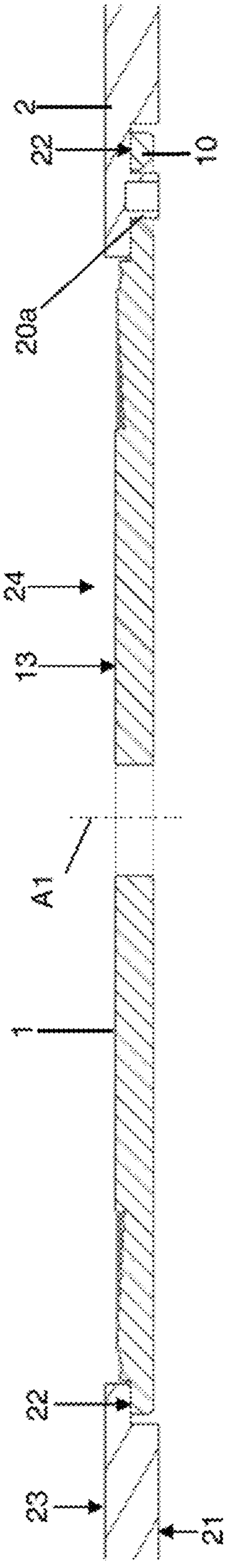
FIG. 3 is a partial view in cross-section of the first embodiment of the dial device according to the plane III-III in FIG. 2, with an applique positioned but not secured.
Figure 4:
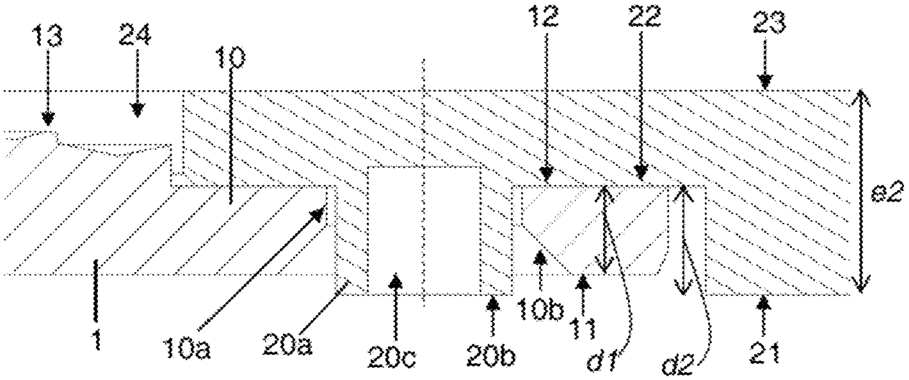
FIG. 4 is a partial view in cross-section of a detail of the first embodiment of the dial device according to the plane III-III in FIG. 2, with the applique positioned but not secured.
Figure 5:
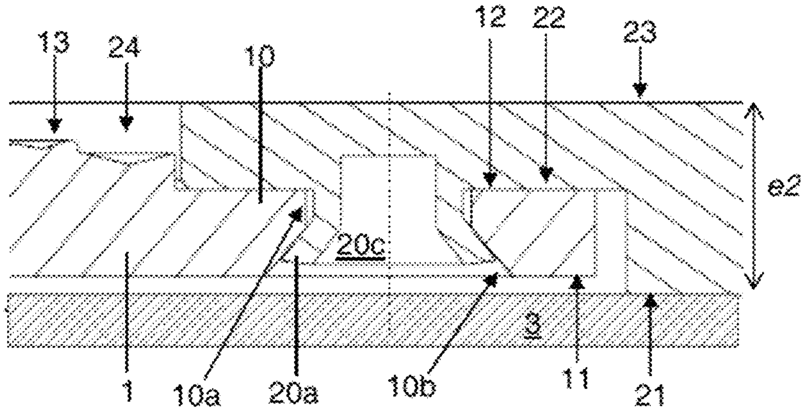
FIG. 5 is a partial view in cross-section of a detail of the first embodiment of the dial device according to the plane III-III in FIG. 2, with the applique positioned and secured.
Figure 6:
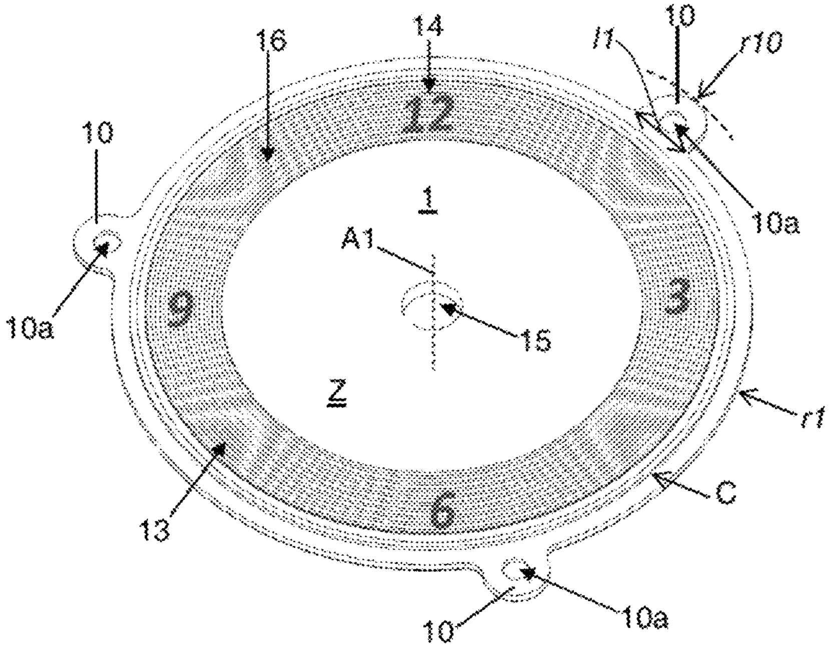
FIG. 6 is a view in perspective of an applique of the first embodiment of the dial device.
Figure 7:
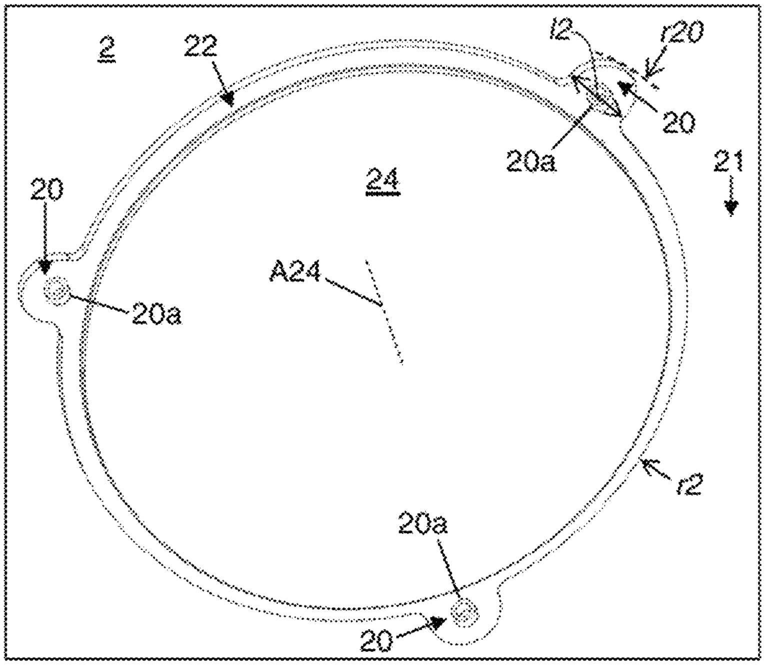
FIG. 7 is a view in perspective of a dial of the first embodiment of the dial device.
Figure 8:
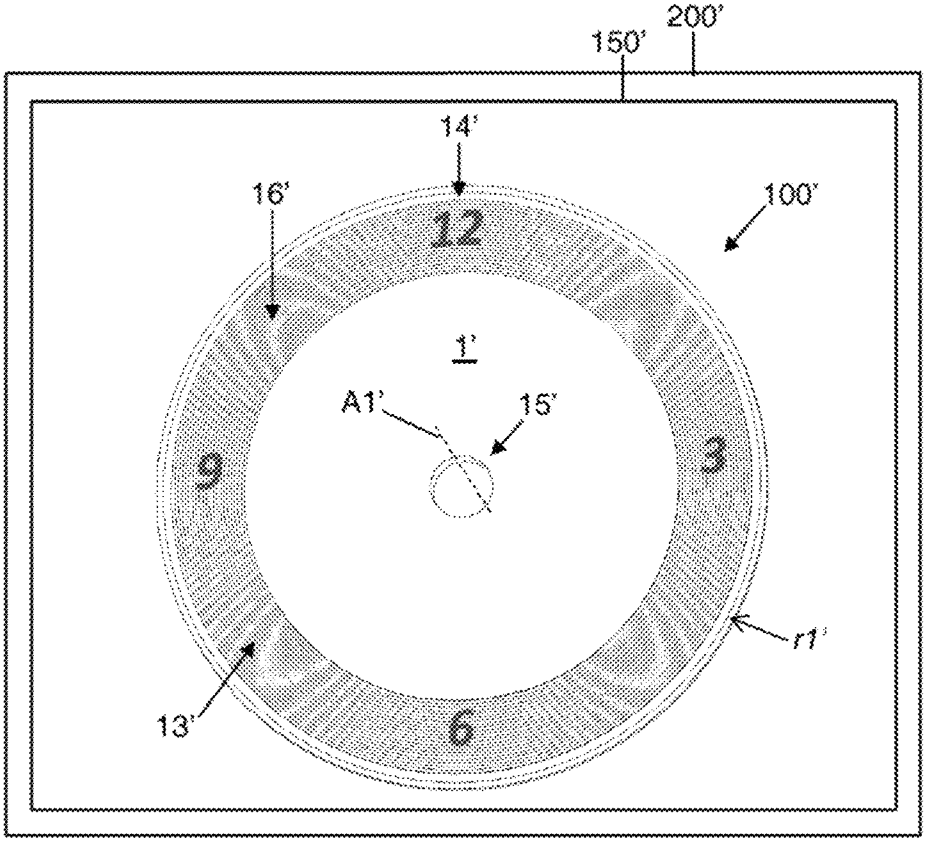
FIG. 8 is a schematic view of a second embodiment of a timepiece, with an applique represented in perspective.
Figure 9:
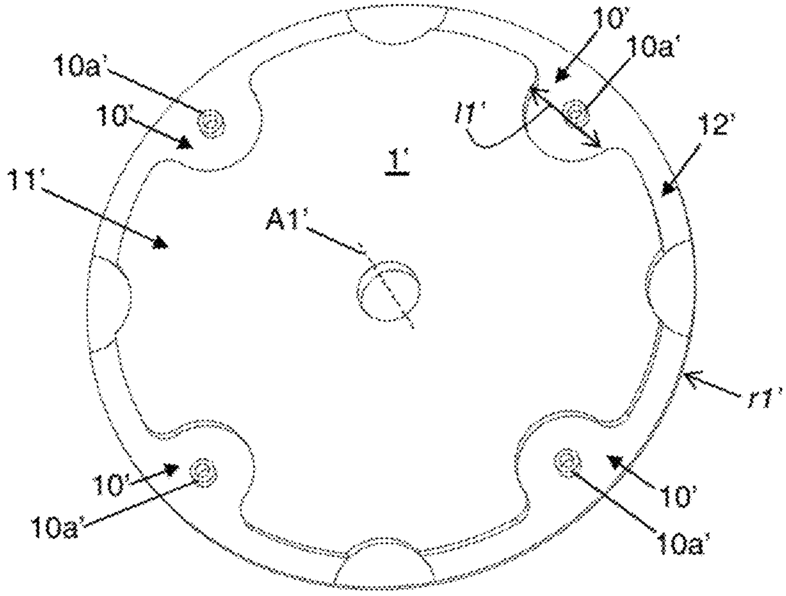
FIG. 9 is another view in perspective of the applique represented in FIG. 8.
Figure 10:
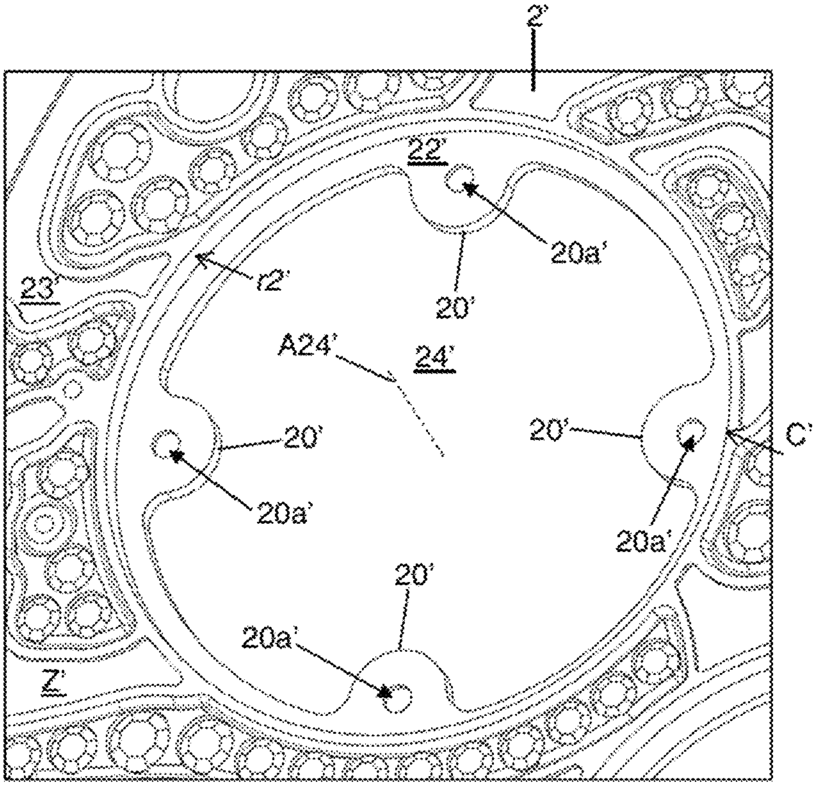
FIG. 10 is a view in perspective of a dial of the second embodiment of the timepiece.
Figure 11:
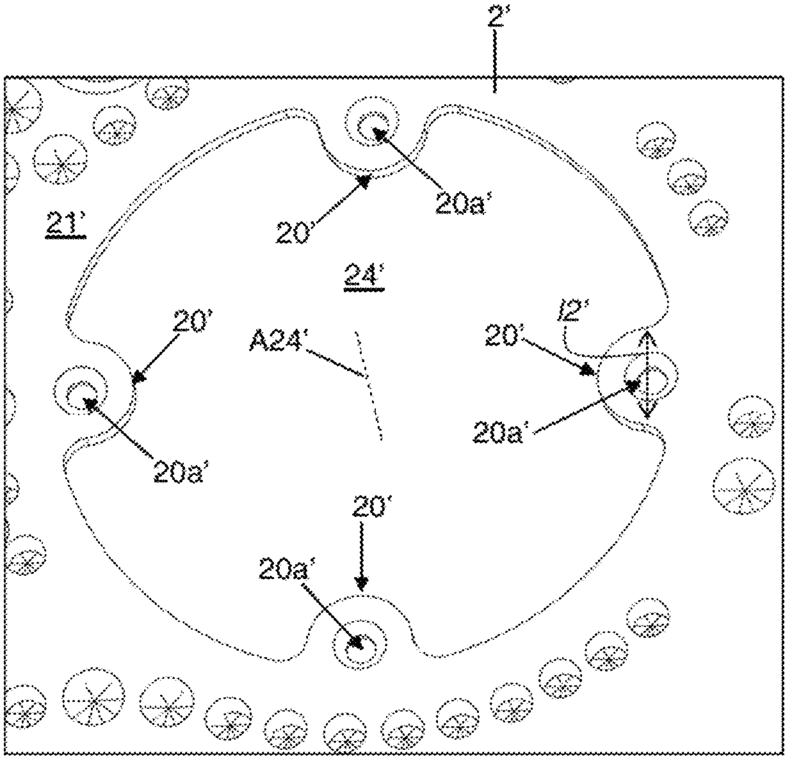
FIG. 11 is another view in cross-section of the dial of the second embodiment of the timepiece.
Figure 12:
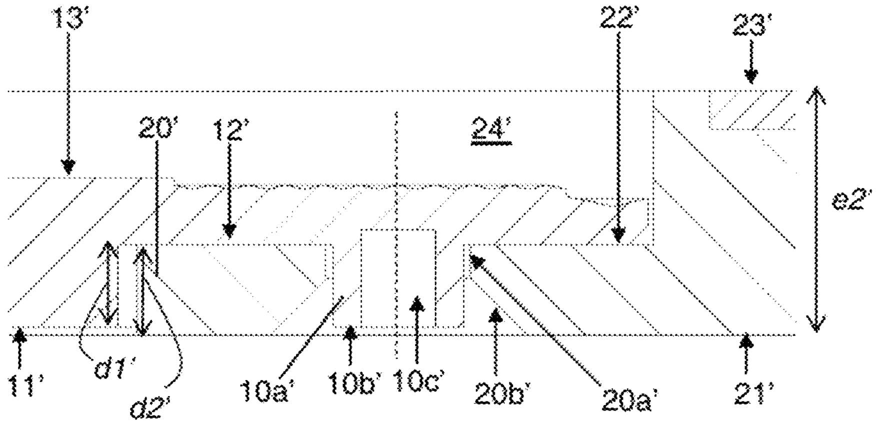
FIG. 12 is a partial view in perspective of a detail of the second embodiment of the dial device, with the applique positioned but not secured.
Figure 13:
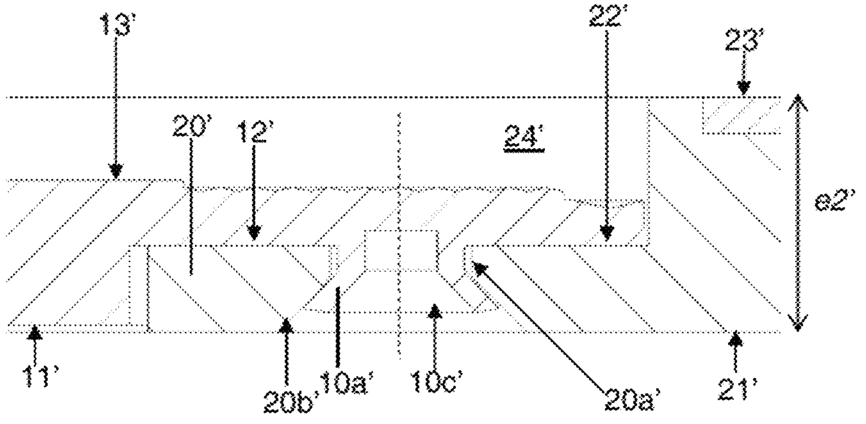
FIG. 13 is a partial view in cross-section of a detail of the second embodiment of the dial device, with the applique positioned and secured.

By way of example, FIGS. 1 and 2 illustrate a dial device 100 comprising three appliques 1*a*, 1*b*, 1*c* with the same geometry, the projections 10 of which are evenly distributed relative to the respective axes A1*a*, A1*b*, A1*c*. In order to make these three appliques cohabit in a confined space around a central axis A2 of the dial, whilst maintaining an adequate dial thickness, the arrangements of the projections 10 and of the openings 20 can vary around the axes A1, A24 according to the location of the appliques on the dial. For example, FIG. 2 illustrates a first applique 1*a*, a projection 10 of which forms a first angle α relative to a horizontal straight line x passing via the axis A1*a* of said applique 1*a*, a second applique 1*b*, a projection 10 of which forms a second angle β relative to the horizontal straight line x passing via the axis A1*b* of said applique 1*b*, as well as a third applique 1*c*, a projection 10 of which forms a third angle γ relative to a horizontal straight line x' passing via the axis A1*c* of said applique 1*c*, the oriented angles α, β, γ being different, and the straight lines x and x' being parallel. Thus, the openings 20 do not intersect, and are far apart enough from one another to provide a dial 2 with an adequate thickness in each of these locations, in particular around a central opening 25 in the dial.

Preferably, the appliques 1*a*, 1*b*, 1*c* each comprise the same number of projections, in particular three projections. It will be appreciated that these appliques can comprise as many projections 10 as necessary.

Alternatively, it will be appreciated that the projections 10 of the applique 1 can be in the form of projections 10 oriented towards the inside of the applique 1, in particular towards a central opening in the applique 1, on a plane which is parallel, or substantially parallel, to the outer surface 13 of said applique which can appear within the opening 24 for receipt of the applique. In this case, the applique can be in the form of an annular component, the central opening of which is concealed by the dial or a part of the dial once the applique is assembled. Irrespective of the variant embodiment, the at least one second element for positioning and/or securing can be disposed on at least one projection 10 extending projecting from a visible area Z of the applique (delimited by a circle C in FIG. 6), and in particular an area visible to the wearer of the timepiece. These projections are preferably concealed by the dial once the applique is assembled on the dial.

A second embodiment of a timepiece 200' according to the invention is described hereinafter with reference to FIGS. 8 to 13.

The timepiece 200' is for example a wristwatch. The timepiece preferably comprises a watch case, a timepiece movement 150' and a second embodiment of a dial device 100'. The timepiece movement and the dial device are fitted secured in the watch case.

The timepiece movement can be an electronic movement or a mechanical movement, in particular an automatic movement.

The dial device 100' comprises at least one applique 1' and a dial 2' provided with an opening 24' for receipt of the applique. The dial comprises at least one first element 20*a*', 20*b*' for positioning and/or securing. The at least one applique comprises at least one second element 10*a*' for positioning and/or securing which cooperates with the at least one first element. By means of this cooperation, the first and second elements for positioning and/or securing make it possible to position and secure the applique on the dial. The device comprises dial-applique interface surfaces 12', 22' which are arranged in the thickness of the dial e2'.

In the second embodiment, the first elements for positioning and/or securing (or guiding and/or mechanical securing) comprise openings 20*a*'. All or part of the first elements for positioning and/or securing are preferably disposed on projections 20' or lugs. Advantageously, the first elements for positioning and/or securing are preferably disposed on projections 20' or lugs. These projections are preferably formed on the periphery of a through opening 24' in the dial 2'. The opening 24' in the dial 2' is designed to receive the applique 1'. These openings 20*a*' are designed to cooperate with the second elements for positioning and/or securing (or for guiding and/or mechanical securing). These second elements comprise feet 10*a*'. These feet are disposed on an inner surface of the applique 1', on the periphery of said applique 1'.

Similarly to the projections 10 disclosed previously, preferably, the projections 20' are in the form of lobes or lugs or projections 20' which are oriented towards the inside of the dial 2', i.e. projecting from the inside of the opening 24' for receipt of the applique, notably on a plane which is parallel or substantially parallel to a surface 21' and/or 23' of the dial. More particularly, these projections 20' are preferably in the form of lobes 20' extending radially relative to an axis A24' which is perpendicular to the surfaces 21' and 23' of the dial. Preferably, when the wearer of the timepiece looks at the dial fitted in the timepiece, the lobes 20' which project in the inside of the opening 24 for receipt of the applique are preferably hided by the applique and are not visible to the wearer of the timepiece. Preferably, the projections are not visible from the outer side of the dial, or are not visible to the wearer of the timepiece.

The projections 20' are designed to be accommodated in openings or housings 10' in the applique. Thus, preferably, an outer surface 13' of the applique 1' can appear at the same level, or substantially at the same level, as an outer surface 23' of the dial 2'.

The openings 10' are preferably blind openings, such that the projections 20' cannot be seen by the wearer looking at the dial device assembled in the timepiece.

This second embodiment is distinguished from the first embodiment by the fact that the applique is assembled from the outer surface 23' of the dial 2', such as to accommodate an outer surface 13' of the applique 1' substantially at the same level as, or recessed from, this outer surface of the dial 23'. This second embodiment is particularly advantageous for permitting the assembly of an applique on a paved dial, which requires a thickness of material sufficient to permit crimping of stones on said dial, and for which the formation of openings 20 according to the first embodiment from an inner surface of the dial is not possible in view of the thickness of material required for the crimping of stones on an outer surface of said dial. Thus, advantageously, the elements for guiding and/or mechanical securing 20*a*' are formed in an area of the dial which is not crimped, since it is designed to receive an applique, and is made not visible after assembly of said applique.

In the manner of the projections 10 of the first embodiment, the projections 20' are preferably in the form of lobes projecting towards the inside of the opening 24' in the dial, and are designed to be accommodated in openings 10' in the applique 1'. These openings 10' have a format which is substantially equivalent to that of the projections 20', and have a geometry which is preferably complementary to that of the projections 20'. Thus, the projections 20' can form alternative or complementary means for positioning of the applique on the dial. Preferably, the format of the openings 10' is minimized, such as to maximize the extent of the inner surface 11' of the applique for which the applique 1' has a maximum thickness. Thus, the risks of deformation of the applique 1' during its securing, in particular by riveting, are greatly minimized.

The base of each of the openings 10' preferably defines a single surface 12' on which the feet 10*a*' are disposed. Preferably, these feet 10*a*' are integral with the applique 1' from the surface 12'. Alternatively, these feet 10*a*' can be added onto the applique, for example by driving, brazing or welding.

According to a preferred form of the second embodiment, each foot 10*a*' is formed such as to pass through an opening 20*a*' from one side to the other, and is in the form of a rivet 10*a*', the free end 10*b*' of which is designed to be deformed plastically against a projection 20', in particular against a chamfer 20*b*' of the opening 20*a*' in a projection 20'. For this purpose, the rivet 10*a*' can for example comprise an opening 10*c*', such as to minimize the thickness of material forming the end 10*b*' of the rivet, and/or such as to introduce a tool permitting the deformation of the end 10*b*' of the rivet. It also makes it possible to avoid or limit as far as possible the deformations of the dial during the assembly of the applique. "Rivet" in this case means any shaft, a free end of which is plastically deformable in order to form a head making it possible to retain at least one element, in this case a dial, on the shaft.

Thus, in cooperation with an opening 20*a*', each rivet 10*a*' defines an element for guiding the applique 1' relative to the dial 2', which depends on the radial gap between the rivet 10*a*' and the opening 20*a*'. In cooperation with an opening 20*a*', each rivet 10*a*' also defines an element for securing the applique 1' on the dial 2', by plastic deformation of the end 10*b*' against a chamfer 20*b*' of the opening 20*a*'. Alternatively, it would be possible to dissociate the function of guiding from that of securing, for example by providing feet 10*a*', in particular pins, which are dedicated specifically to the guiding function, as well as feet 10*a*', in particular rivets, which are dedicated specifically to the securing function.

In addition, the surface 12' of the applique 1' defines a support surface of a surface 22' of a projection 20' of the dial 2'. This surface 12' is preferably distinct from the inner surface 11' of the applique 1'. In particular, the surfaces 12' and 11' can be formed on distinct planes, in particular on parallel and distant planes.

Preferably, the dial-applique interface surfaces 12' and 22' are planes.

Preferably, the distance d2' which separates the inner surface 21' of the dial and the surface 22' of the projection 20' of the dial, i.e. the thickness of the projections 20', the surfaces 21' and 22' being respectively the inner and outer surfaces of the dial at a projection 10, is greater than the distance d1' which separates the surfaces 11' and 12' of the applique 1', i.e. greater than the depth of the openings 10'. Thus, the applique is embedded in the thickness of the dial. Also advantageously, it is possible to embed the applique in the thickness of the dial, such that no riveting extends from the surface 21' of the dial, which can constitute a support surface for a movement blank 3' of the timepiece movement 150'. Also preferably, the thickness of the applique (measured between the surfaces 11' and 13') is preferably disposed in the thickness e2' of the dial which separates the inner 21' and outer 23' surfaces of the dial.

Preferably, the elements 20*a*', in particular the openings 20*a*' in the dial 2' are all identical.

Also preferably, the projections 20' of the dial 2' are all identical.

The same preferably applies to the elements 10*a*' of the applique 1', in particular the feet 10*a*', as well as to the openings 10' in the applique.

In addition, the projections 20' and the elements 20*a*' are preferably evenly distributed relative to an axis A24' which is centered on the opening 24' in the dial 2. Thus, the applique does not need to be indexed relative to the dial when it is assembled. A form of this type is particularly advantageous if the applique is marked, in particular pad-printed, only after assembly on the dial, for example for adding of a limb 14' on the upper surface 13' of the applique 1'.

A limb of this type can advantageously be provided in order to cooperate with an indicator unit, which is not represented in the figures, and is designed to be accommodated in a through opening 15' in the applique, in particular a central opening 15'.

Alternatively, a projection 20' or an opening 20*a*' could constitute a coding means, such as to define a univocal positioning of the applique on the dial. For this purpose, the dial 2' can comprise projections 20' and/or openings 20*a*' with different geometries. A form of this type is particularly advantageous if the surface 13' of the applique is already marked, in particular pad-printed, before it is fitted on the dial. The gap between at least one projection 20' or an opening 20*a*' and at least one opening 10' or a foot 10*a*' can thus be minimized, such as to assist a univocal positioning of the applique 1' on the dial 2'.

In addition, the openings 10' have a format which is substantially equivalent to that of the projections 20', and have a geometry which is preferably complementary to that of the projections 10'.

Preferably, the projections 20' have a width 12' (measured parallel to the surface 21' or 22') which is less than 15 times the distance d2', or less than 10 times the distance d2', or less than 8 times the distance d2'.

Also preferably, the openings 10' have a width 11' (measured parallel to the surface 11' or 12') which is less than 15 times the distance d1', or less than 10 times the distance d1', or less than 8 times the distance d1'.

"Width" means the greatest distance (measured orthoradially relative to the axis A24' of the opening 24 in the dial or to the axis A1' of the applique) separating two opposite walls of an opening 10' or of a projection 20' extending radially relative to the axis A1' of the applique or to the axis A24' of the opening 24 in the dial.

In the case of a circular applique, the radius r1' of the applique 1' is substantially equal to the radius r2' defined by the support surface 22' of the dial 2'.

In the manner of the first embodiment, once the applique 1' is assembled on the dial 2', the axes A1' and A24' are preferably merged.

In this second embodiment, the opening in the dial 24' comprises four projections 20'. It will be appreciated that said opening 24' can comprise as many projections 20' as necessary, in particular in relation to the expected hold of the applique 1' on the dial 2'.

Preferably, the upper surface 13' of the applique 1' comprises decoration 16' which is produced by means of guilloché work or planing or snailing, which is different from that of the dial 2'. By way of example, part of the upper surface 13' of the applique 1' illustrated in FIG. 8 comprises circular guilloché work 16'.

Alternatively, the projections 20' of the dial 2' can project towards the outside of an opening 24' which is designed to receive an applique 1'. In this case, the applique 1' can be in the form of an annular component. Thus, the at least one first element for positioning and/or securing can be disposed on at least one projection 20' extending projecting from an outer periphery of an opening 24' in the dial, or from an inner periphery of an opening 24' in the dial, i.e. extending projecting from a visible area Z' of the dial (delimited by a circle C' in FIG. 10), in particular an area visible to the wearer of the timepiece. These projections are preferably concealed by the applique, once the applique is assembled on the dial.

Irrespective of the embodiment or the variant, the dial device can have more than one applique added and secured on the dial. It can however comprise any other number of appliques, in particular one or two or three or four or five appliques. In this case, the different appliques can be identical or similar or different. In the embodiment in FIGS. 1 to 7, the device comprises three appliques.

Irrespective of the embodiment or the variant, the concept of an applique is to be considered in the broadest sense. Thus, an applique 1 can act as a counter or indicator designed to indicate a time indication or derivative of the time in cooperation with an accessory indicator unit, in particular a hand. More particularly, the applique 1 can comprise a limb which is designed to cooperate with an indicator unit, in particular a hand. Alternatively, the applique can be exclusively decorative. For example, it can constitute the base of a pattern decorated by means of a through cut provided in the dial.

Irrespective of the embodiment or the variant, the appliques can have circular forms. They can also have any other form.

Irrespective of the embodiment or the variant, the applique, i.e. the inner surface 11, 11' of the applique, is preferably arranged recessed from the inner surface 21, 21' (which is not visible) of the dial.

Irrespective of the embodiment or the variant, the applique, i.e. the outer surface 13, 13' of the applique, is preferably arranged recessed from the outer surface 23, 23' (which is visible) of the dial. Alternatively, the outer surface 13, 13' of the applique can be flush with the outer surface 23, 23' (which is visible) of the dial. Also alternatively, the outer surface 13, 13' of the applique can project relative to the outer surface 23, 23' (which is visible) of the dial.

As previously seen, according to the embodiment, the dial can comprise at least one first projection 20' from the first visible area Z' of the dial, or the applique can comprise at least one second projection 10 from a second visible area Z of the applique. Irrespective of the embodiment or the variant, one or a plurality of projections can constitute an element for complementary or alternative positioning of the applique on the dial.

Alternatively to the embodiments represented, the securing elements (in particular the feet or the openings) are not necessarily situated on these projections. These projections can have a function of blocking the applique in rotation relative to the dial. These projections can also be provided on the applique, and interposed between the dial and another element (such as a movement blank element) in order to reinforce the hold of the securing of the applique on the dial, and in particular to reinforce the resistance to impacts.

Irrespective of the embodiment or the variant, one or a plurality of projections can be provided with securing elements (such as feet and/or openings), and one or a plurality of projections can be without a securing element.

The solutions according to the invention make it possible to provide a repeatable and perpetual assembly of an applique, and in particular a counter, on a dial, implementing elements for guiding and/or mechanical securing which are disposed, according to the embodiment, on projections formed on the periphery of the applique or on the periphery of an opening in the dial, which opening is designed to receive the applique. More particularly, these elements for guiding and/or securing are in the form of openings which are designed to cooperate with complementary elements, such as feet forming pins or rivets, disposed, according to the embodiment of the assembly solution, on the dial or on the applique.

The first embodiment is particularly advantageous in relation to the resistance to impacts of the applique.

The second embodiment has the advantage of proposing a solution for mechanical assembly of an applique on a dial which is paved, and in particular integrally paved.

Throughout this document, "outer surface" means a surface of a timepiece component which is designed for an orientation towards the outside of a timepiece, in particular including a surface which is directly visible to an observer of the timepiece. An outer surface of a component which is in the watch case is oriented such that a half-line which is normal to this surface, and starts from this surface without passing through the component, passes through the glass of the timepiece.

Throughout this document, "inner surface" means a surface of a timepiece component which is designed for an orientation towards the inside of a timepiece, in particular including a surface which is not visible to an observer of the timepiece. An inner surface of a component which is in the watch case is oriented such that a half-line which is normal to this surface, and starts from this surface without passing through the component, passes through the base of the timepiece.

In this whole document, the meaning of "lobe" or "lug" does not cover a "dial foot". Indeed, a dial foot extends perpendicularly or substantially perpendicularly to the main dial surface.

As previously explained, in the various embodiments, the dial-applique interface surfaces 12, 22; 12', 22' are arranged in the thickness of the dial, i.e. between a plane on which the outer surface of the dial lies and a plane on which the inner surface of the dial lies. The interface surfaces are advantageously plane. Alternatively, the interface surfaces may be (slightly) conical.

The invention claimed is:

1. A dial device comprising at least one applique and a dial provided with an opening for receipt of the at least one applique, the dial including at least one first element for positioning and/or securing, the at least one applique including at least one second element for positioning and/or securing cooperating with the at least one first element, the device including dial-applique interface surfaces which are arranged in the thickness of the dial, wherein the dial-applique interface surfaces extend substantially perpendicular to the thickness direction of the dial, the dial comprises at least one first projection extending substantially perpendicularly to the thickness direction of the dial from a first visible area of the dial, and wherein the at least one first element for positioning and/or securing is disposed on the at least one first projection.

2. The dial device as claimed in claim 1, wherein the at least one first element for positioning and/or securing comprises a foot or a hole.

3. The dial device as claimed in claim 2, wherein the foot comprises a deformable end.

4. The dial device as claimed in claim 3, wherein the deformable end comprises an end of a rivet type.

5. The dial device as claimed in claim 1, wherein the at least one first element for positioning and/or securing is disposed on the at least one first projection.

6. The dial device as claimed in claim 5, wherein the width of the at least one first projection is less than 15 times the thickness of the at least one first projection.

7. The dial device as claimed in claim 1, wherein the at least one applique comprises at least one first housing for receipt of the at least one first projection.

8. The dial device as claimed in claim 1, comprises at least one first applique which is positioned relative to the dial according to a first orientation defined by a first angle, and a second applique which is positioned according to a second orientation defined by a second angle, the first and the second orientations being different.

9. The dial device as claimed in claim 8, wherein the first and the second orientations forming an angle or having a difference of at least 10° relative to one another.

10. The dial device as claimed in claim 1, wherein the at least one first element for positioning and/or securing comprises feet which are disposed on an inner face of the dial.

11. The dial device as claimed in claim 1, wherein the at least one applique is arranged recessed from a non-visible surface of the dial, and/or wherein the at least one applique is arranged recessed from a visible surface of the dial, and/or wherein the device comprises a coding means for fitting of the at least one applique on the dial.

12. A timepiece, comprising a dial device as claimed in claim 1.

13. The timepiece as claimed in claim 12, comprises a movement including a movement blank, the at least one applique being disposed between the dial and the movement blank.

14. The dial device as claimed in claim 1, wherein the at least one applique comprises at least one first housing for receipt of the at least one first projection.

15. The dial device as claimed in claim 1, wherein the at least one second element for positioning and/or securing comprises feet which are disposed on an inner face of the at least one applique.

16. A dial device comprising at least one applique and a dial provided with an opening for receipt of the at least one applique, the dial including at least one first element for positioning and/or securing, the at least one applique including at least one second element for positioning and/or securing cooperating with the at least one first element, the device including dial-applique interface surfaces which are arranged in the thickness of the dial, wherein the dial-applique interface surfaces extend substantially perpendicular to the thickness direction of the dial, wherein the at least one applique comprises at least one second projection from a second visible area of the applique, and wherein the at least one second element for positioning and/or securing is disposed on the at least one second projection.

17. The dial device as claimed in claim 16, wherein the at least one second element for positioning and/or securing comprises a hole or a foot.

18. The dial device as claimed in claim 17, wherein the foot comprises a deformable end.

19. The dial device as claimed in claim 16, wherein a width of the at least one second projection is less than 15 times the thickness of the at least one second projection.

20. The dial device as claimed in claim 16, wherein the dial comprises at least one second housing for receipt of the at least one second projection.

21. The dial device as claimed in claim 16, comprises at least one first applique which is positioned relative to the dial according to a first orientation defined by a first angle, and a second applique which is positioned according to a second orientation defined by a second angle, the first and the second orientations being different.

22. The dial device as claimed in claim 21, wherein the first and the second orientations forming an angle or having a difference of at least 10° relative to one another.

23. The dial device as claimed in claim 16, wherein the at least one applique is arranged recessed from a non-visible surface of the dial, and/or wherein the at least one applique is arranged recessed from a visible surface of the dial, and/or wherein the device comprises a coding means for fitting of the at least one applique on the dial.

24. A timepiece, comprising a dial device as claimed in claim 16.

25. The timepiece as claimed in claim 24, comprises a movement including a movement blank, the at least one applique being disposed between the dial and the movement blank.

26. The dial device as claimed in claim 16, wherein the foot comprises a deformable end.

27. The dial device as claimed in claim 26, wherein the deformable end comprises an end of a rivet type.

* * * * *